Jan. 26, 1932.  A. DE WEERD  1,843,016
WIND INDICATOR FOR LANDING FIELDS
Filed Dec. 18, 1928    2 Sheets-Sheet 1

Albert DeWeerd,
INVENTOR
BY Victor J. Evans
ATTORNEY

Jan. 26, 1932.  A. DE WEERD  1,843,016
WIND INDICATOR FOR LANDING FIELDS
Filed Dec. 18, 1928  2 Sheets-Sheet 2
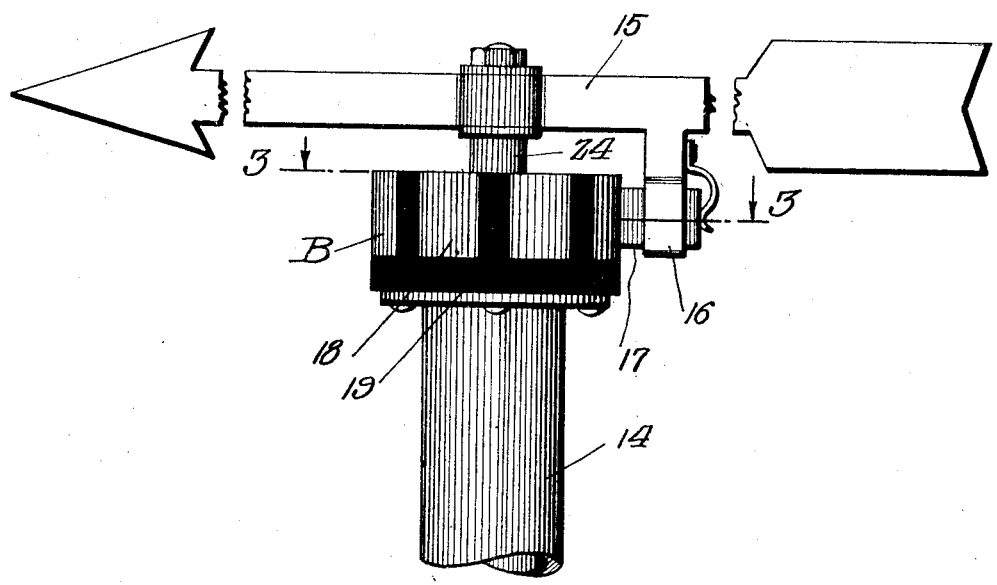
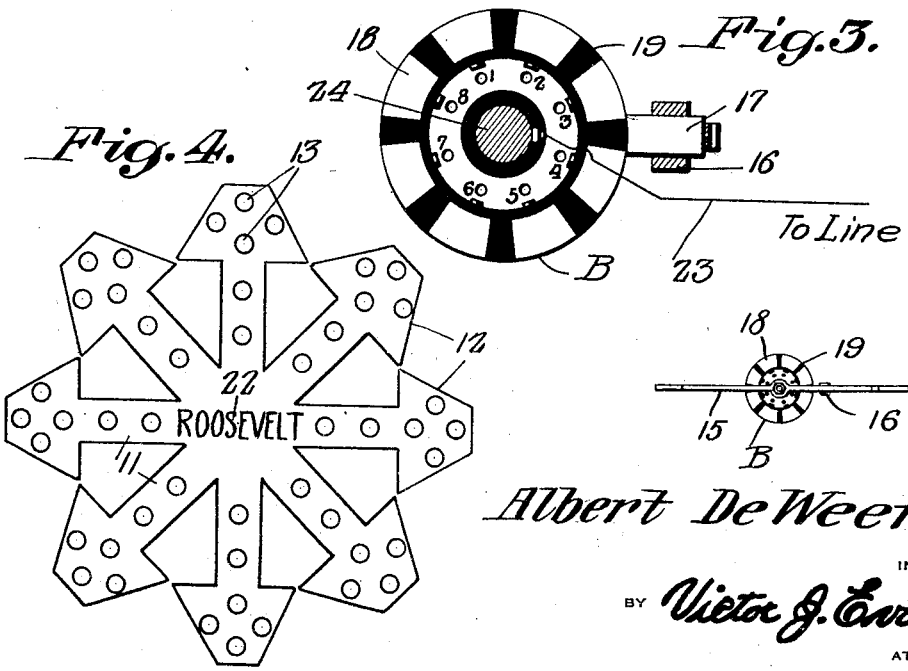

Patented Jan. 26, 1932

1,843,016

UNITED STATES PATENT OFFICE

ALBERT DE WEERD, OF ROOSEVELT, NEW YORK, ASSIGNOR OF ONE-EIGHTH TO JOHN S. CRUGER, OF ROOSEVELT, NEW YORK

WIND INDICATOR FOR LANDING FIELDS

Application filed December 18, 1928. Serial No. 326,811.

This invention relates to a wind indicator for landing fields, the general object of the invention being to provide a member operated by the wind and located a distance from the field and a plurality of groups of lamps located in the field, each group, when lighted, forming illuminated means for indicating to the pilot the direction of the wind, with means for closing the circuits of the lamps of the groups by the wind operated member whereby that group of lamps, the circuit of which is closed by the wind operated member, will point in the same direction as said member, so that the pilot can ascertain the direction the wind is blowing before landing.

Another object of the invention is to provide illuminated means for indicating the name of the field.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 2 is an elevation of the wind operated means and the circuit closing means operated thereby.

Figure 3 is a section on line 3—3 of Figure 2.

Figure 4 is a plan view of the indicating means.

Figure 1:
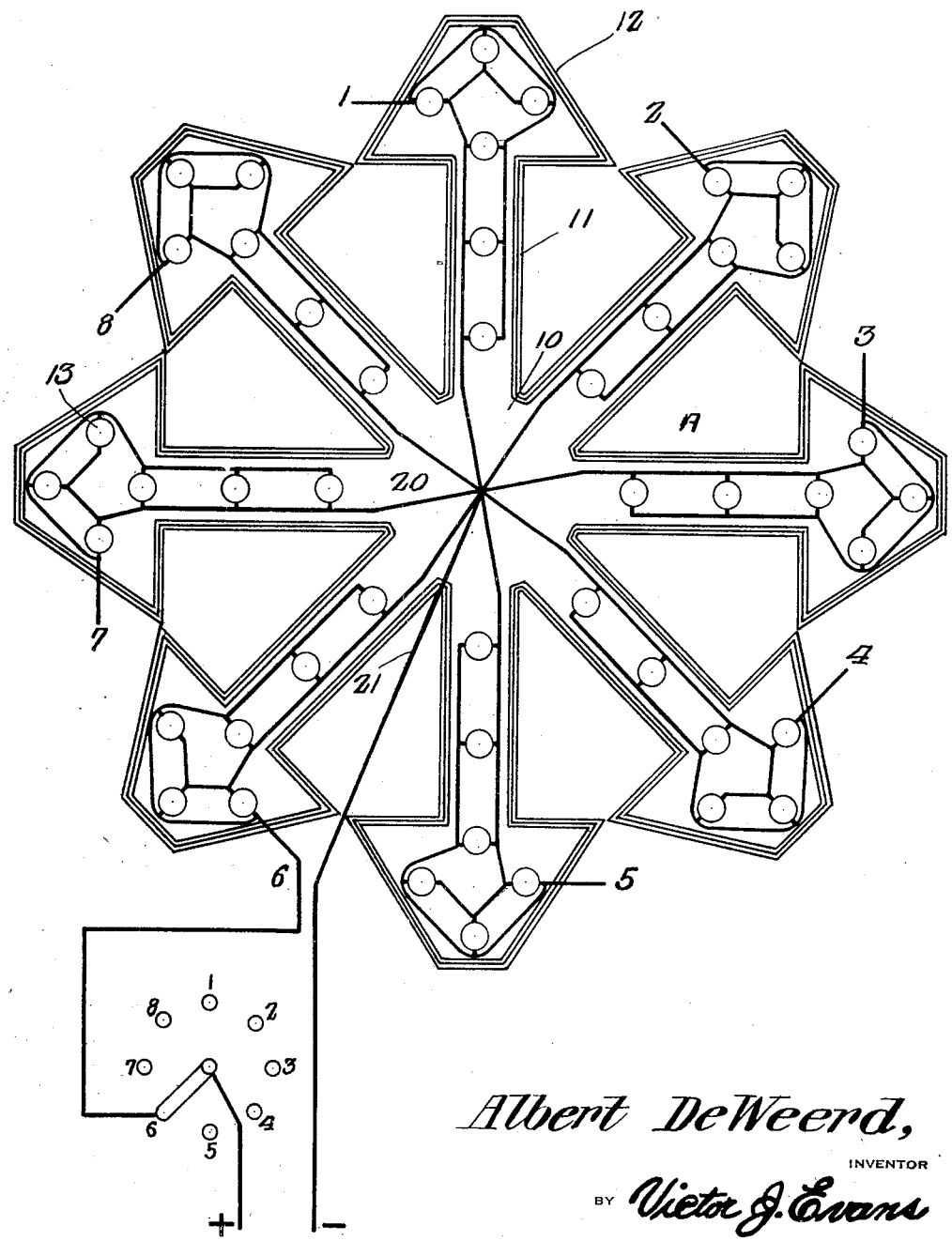
Figure 1 is a diagrammatic plan view of the lamp carrying means for indicating the direction the wind is blowing.

In these drawings, the letter A indicates a casing placed on a suitable base arranged on the field, this casing including the central circular part 10, the radiating arms 11 and the enlarged parts 12 at the outer ends of the arms. Each arm and its enlarged part 12 forms an arrow-shaped member. I prefer to so arrange these arrow-shaped members that they point one to the north, one to the east, one to the south and one to the west, with the intermediate members pointing respectively to the northeast, southeast, southwest and northwest. The top of the casing is formed of transparent material and a group of lamps 13 is arranged in each arrow-shaped member, as shown.

A mast 14 is also placed outside the field and rotatably supports at its upper end an arrow 15 or other wind operated member, this arrow having a depending part 16 which carries a spring actuated brush 17 which engages the commutator B carried by the mast. This commutator is composed of the sections 18 of conducting material and the strips 19 of non-conducting material which insulate the strips 18 from each other and from the supporting means of the commutator. Each section 18 is electrically connected to each group of lamps and each group of lamps is also connected by the conductors 20 with a line wire 21. Thus it will be seen that the movement of the member 15 by the wing will cause the brush 17 to pass over the commutator so that the circuit of the group of lamps will be closed in that arrow-shaped member which is pointing in the same direction as the arrow 15. Thus the pilot of the flying machine can ascertain in which direction the wind is blowing over the field so that he can head his ship in the proper direction in landing.

I also arrange on the central part 10 of the casing the illuminated letters 22 which indicate the name of the field.

While the drawings show the casing composed of eight arrow-shaped members numbered from 1 to 8 respectively and the same number of sections 18 in the commutator which are also numbered from 1 to 8 respectively, it will, of course, be understood that any desired number of these members may be used.

The wires to the commutator may pass through the mast which is made hollow for this purpose, and in this case, the second line wire 23 would be connected with the rotary support 24 of the arrow-shaped member.

By arranging the mast outside the field, or a distance from the field, there is no danger of the aircrafts striking the mast while landing or taking off, and thus being damaged by the mast.

I prefer to so arrange the arrows formed by the casing and its lights that they point to the main runways of the field so that the device forms a wind indicator, a field indicator and a runway indicator.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A wind indicator for landing fields comprising circular arranged contacts insulated from each other and each electrically connected to a signal, an extension rising above the contacts and centrally thereof, a wind actuated member journalled on the extension, a brush arm electrically connected to the signal and carried by the wind actuated member and having an opening, a brush slidable in the opening to engage the contacts during the rotation of said wind actuated member, and a spring secured to the arm and bearing against the brush to urge the latter toward the contacts.

In testimony whereof I affix my signature.

ALBERT DE WEERD.